United States Patent [19]
Adkins, Sr. et al.

[11] Patent Number: 5,404,959
[45] Date of Patent: Apr. 11, 1995

[54] DRILL RIG SAFETY SHUTDOWN DEVICE

[75] Inventors: Stephen B. Adkins, Sr., Snellville; Phillip L. Myers, Lithonia, both of Ga.

[73] Assignee: Longyear Company, Stone Mountain, Ga.

[21] Appl. No.: 237,444

[22] Filed: May 3, 1994

[51] Int. Cl.6 .................................................. E21B 44/00
[52] U.S. Cl. ......................................... 175/319; 175/24
[58] Field of Search ..................... 175/319, 45, 24, 27, 175/38, 40; 192/129 R; 173/2

[56] References Cited

U.S. PATENT DOCUMENTS

| | | | |
|---|---|---|---|
| 4,403,664 | 9/1983 | Sullinger | 175/24 |
| 4,407,017 | 9/1983 | Zhilikov et al. | 175/24 X |
| 4,976,321 | 12/1990 | Van Meter | 175/24 |
| 5,085,280 | 2/1992 | Rassieur . | |

*Primary Examiner*—Michael Powell Buiz
*Attorney, Agent, or Firm*—Jones & Askew

[57] ABSTRACT

A safety shutdown system for a rotary drill rig with a power supply, a support frame and a rotary drill spindle and drill tool connected to the support frame. The drill spindle and tool are driven by a drive train that is connected by a clutch with a declutch mechanism to an internal combustion engine and an engine solenoid with a shut-off switch. A brake with a brake solenoid is also provided on the drive train. An infrared beam transmitter is positioned adjacent to the drill tool and an infrared beam receiver is positioned adjacent to the drill tool and on the opposite side of the drill from the transmitter so that the receiver can receive infrared beams emitted from the transmitter. A controller is connected between the clutch solenoid and the engine solenoid. The controller is activated when the infrared beam between the transmitter and the receiver is interrupted. The controller activates at least one of the clutch engaging solenoid and the engine solenoid to stop the drill spindle and drill tool.

3 Claims, 4 Drawing Sheets

DRILL RIG SAFETY SHUTDOWN DEVICE

TECHNICAL FIELD

The present invention relates to drill rigs, and more particularly relates to safety shutdown devices for stopping a drill rig to protect an operator from becoming entangled in the drill rig's drill spindle or auger.

BACKGROUND OF THE INVENTION

Drill rigs are commonly used to drill for samples in connection with environmental testing of soil and ground water. Also, drill rigs are used during construction of various structures and in connection with land stability testing which is typically completed prior to any substantial construction on a site. Drill rigs are also used to drill wells for water.

Conventional drill rigs for such drilling operations generally comprise a drill spindle with means for attaching various drill tools, including, but not limited to, augers and drill rods. The drill spindle is mounted for rotation on a support frame. The support frame is typically mounted on a truck for transport to and from the drilling site. The spindle and the drill tools are driven by an internal combustion engine through a drive train. The drill rig also has means, usually a hydraulic cylinder, for raising and lowering the spindle and drill tools. Because such drilling operations require the drilling of and through many hard materials which can be located well below ground level, the auger or drill tool of such drill rigs is often large and requires a powerful internal combustion engine.

Such drill rigs can be dangerous in operation because there are many times when access to the area immediately surrounding the rotating drill tool is necessary for testing or for proper operation of the drill rig. For instance, access to the rotating drill tool is often needed for cleaning the drill tool, checking the soil condition, or removing cuttings which can accumulate around the hole being drilled.

Because of the size, speed, and risk involved in use of drill rigs, safety shutdown systems have been used in the past to stop drill spindle and drill tool rotation in an emergency. However, these prior shutdown systems require some type of physical actuation, such as pushing a "stop" button or hitting a wobble type switch. In other words, safety shutdown systems used with drill rigs in the past have been reactive, which requires operator action after the operator is already entangled in the drill tool, as opposed to proactive, which reduces the risk of entanglement of an operator in the first instance.

The prior art systems are able to shutdown a drilling rig in a number of different ways, such as shutting off of the engine which drives the drill spindle, placing the clutch of the drive train in the neutral position so that the drive train is disengaged from the engine, and/or applying a brake directly to the drive train to stop the drill spindle. U.S. Pat. No. 5,085,280, issued to Rassieur (the "'280 patent"), describes a safety shutdown system which employs all of the system shutdown ways discussed above, both separately and in various combinations. The apparatus of the '280 patent uses a wobble type switch adjacent to the drill spindle to activate the drill rig shutdown system. When the operator is in trouble, he or she can reach out and hit the wobble switch to stop the drill spindle. One safety feature of the '280 patent listed above is the brake which is applied directly to the drive train of the drill when the shutdown system is activated. The brake can decrease the time in which to stop spindle rotation. When the drill spindle is not engaged in drilling, several rotations may occur after the engine is shut off or the clutch disengaged. In that circumstance, the brake is useful in stopping the drill tool and spindle after an operator has become entangled in an attempt to reduce the degree of injury sustained. When the drill tool and spindle are engaged in drilling, the drill tool and spindle stop fairly quickly even without the brake. Use of the brake in that circumstance can reduce the stopping time by only a small amount. Although using a wobble switch provides the advantage of shutting down a drill rig by hitting the switch in any direction, access to the switch may be difficult if a drill rig operator is already entangled by the drill tool. Furthermore, by the time that a drill operator is able to hit a wobble switch, the operator may have already incurred substantial bodily injury.

From a safety standpoint, it is advantageous to have a pre-established safety zone which, if violated by the operator, would shut down the drill tool and spindle before the operator becomes entangled. On the other hand, it is also important that a safety shutdown system not impede the efficient operation of the drill rig. One system known in the art with a pre-established safety zone utilizes a large cage around parts of the drill tool and spindle to prevent the drill rig operator from gaining access to the drill tool and spindle during operation. However, the cage can hinder operation of the drill rig by not allowing the operator the easy access to the drill tool and spindle needed to perform some of the tasks listed above. Because use of the cage can hinder operation of the drill rig, many operators will not use it even if it is available to them.

Thus, there is a need in the art for a safety shutdown system for a drill rig which is proactive in operation (shuts down the drilling rig before the operator can become entangled) and which does not hinder the operation of the drill rig by not allowing the operator limited access to the drill rig during operation.

SUMMARY OF THE INVENTION

The present invention solves the above-described problems in the art by providing a proactive apparatus to shut down a rotary drill rig before an operator can become entangled in the drill tool. The apparatus of the present invention uses an infrared monitor including one or more infrared beam transmitters and receivers to establish a zone of exclusion adjacent the drill tool. The infrared monitor senses whether objects have violated the zone of exclusion around the rotating drill tool. If intrusion by an object is detected, the drill rig system is shut down so that the drill spindle and drill tool stop rotation to prevent injury to any person or damage to any other object.

The present invention is used in connection with a conventional drill rig. The drill rig generally has a support frame with a rotary drill spindle mounted for rotation on the support frame with means for lowering and raising the drill spindle during rotation. The drill spindle is driven by a drive train which is connected by a clutch to an internal combustion engine. A drill tool is attached to the drill spindle by using an adaptor. The drill tool is operated from the rotation of the drill spindle. The clutch may be activated by means of a brake/clutch solenoid which may also activate a brake on the drive train. The internal combustion engine is equipped with an engine solenoid having an engine shut-off valve. A brake on the drive train may also be provided with the corresponding brake/clutch solenoid.

Particularly, the present invention is implemented by an infrared monitor, consisting of one or more infrared transmitters and receivers, and a shutdown controller. For example, an infrared beam transmitter may be positioned adjacent to the drill tool and an infrared beam receiver positioned adjacent to the drill tool and on the opposite side of the drill tool from the beam transmitter so that it can receive infrared beams emitted from the transmitter. The output of the infrared receiver is connected to the shutdown controller. The controller is used to operate the engine solenoid, and/or the brake/clutch solenoid.

The infrared beams between the infrared transmitters and receivers define a zone of exclusion around the drill tool. When one of the infrared beams is interrupted by the operator or an object entering the zone of exclusion, the controller, in response to a signal from the interrupted infrared receiver, may activate at least one of the engine solenoid or the brake/clutch solenoid in order to stop the drill spindle and drill tool.

Thus, it is an object of the present invention to provide a rotary drill rig shutdown device which is proactive such that physical actuation of a shutoff switch is not required.

It is a further object of the present invention to provide a drill rig shutdown device which defines a zone of exclusion adjacent the drill tool so that the drill rig operator has only limited access to the drill tool during operation.

That the present invention meets these objects and overcomes the drawbacks of the prior art described hereinabove will be apparent from the detailed description of the preferred embodiment that follows.

DETAILED DESCRIPTION

Figure 1:
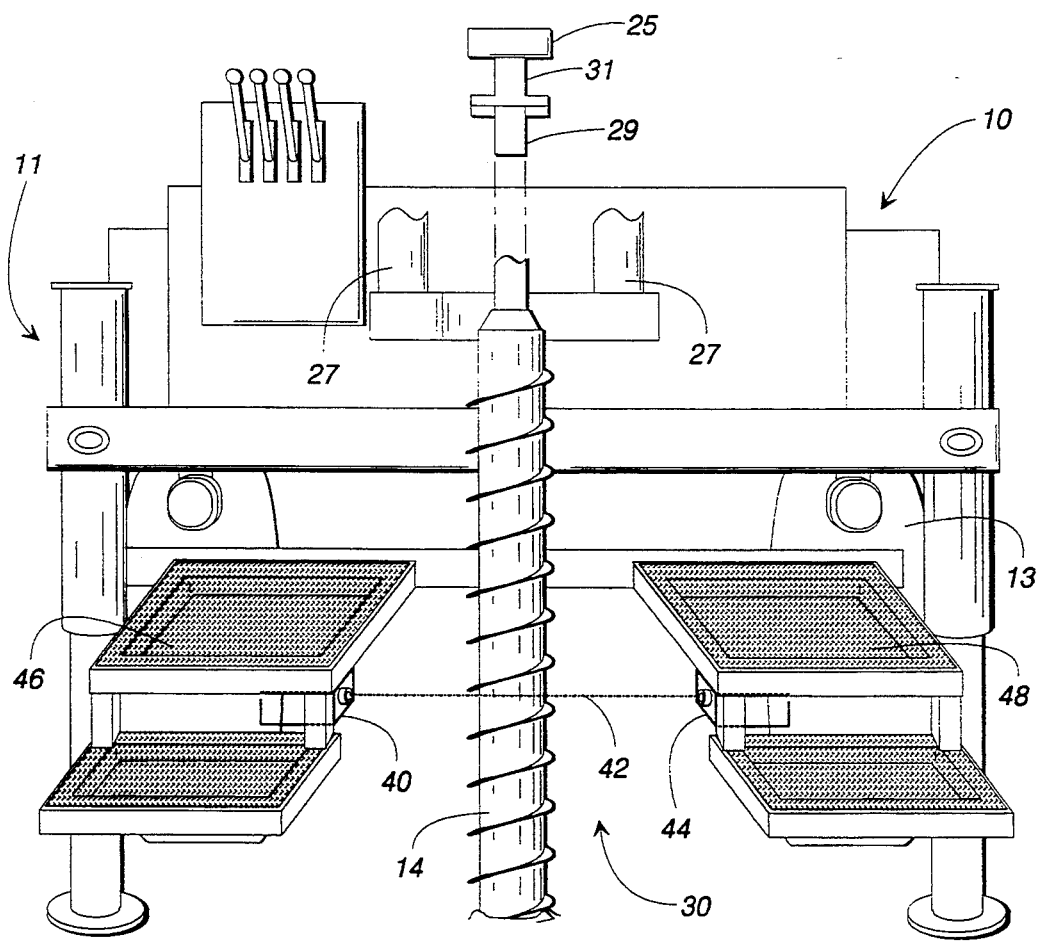
FIG. 1 is a front elevation view of a drill rig including the shutdown device of the present invention.
Figure 2:
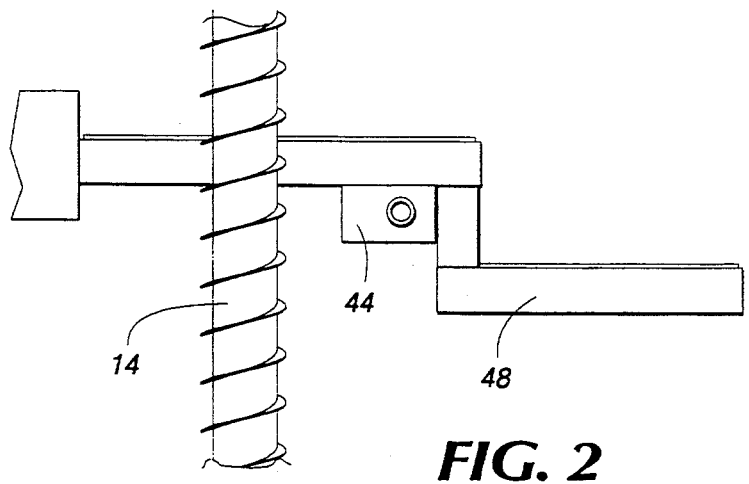
FIG. 2 is a side elevation view which shows the drill tool as an auger, and part of the shutdown device, as located on the "helpers step" of the drill rig.
Figure 4:
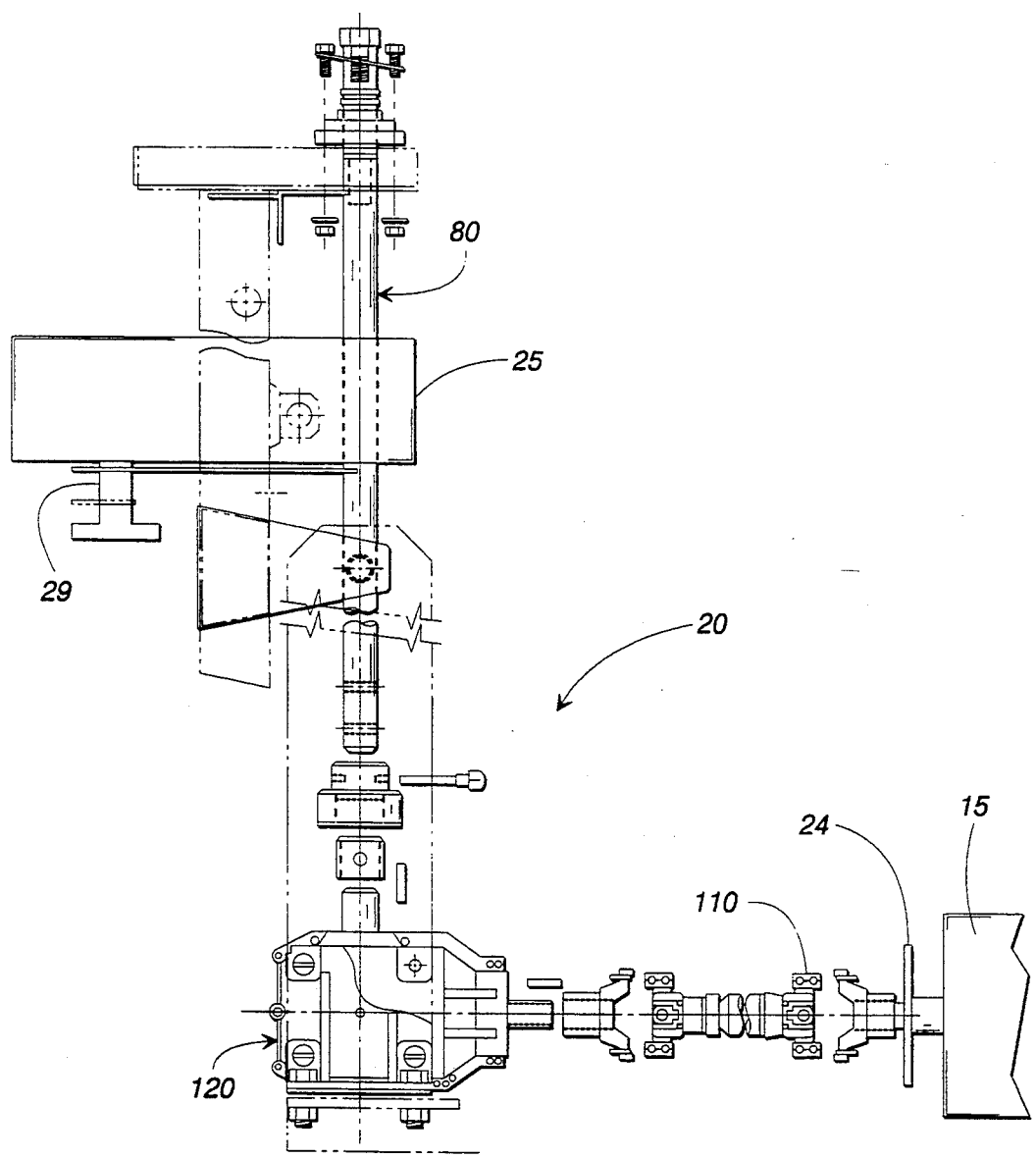
FIG. 4 shows an exploded view of the physical structure of the drive train system of a drill rig with a brake diagramatically shown on the drive train system.
Figure 5:
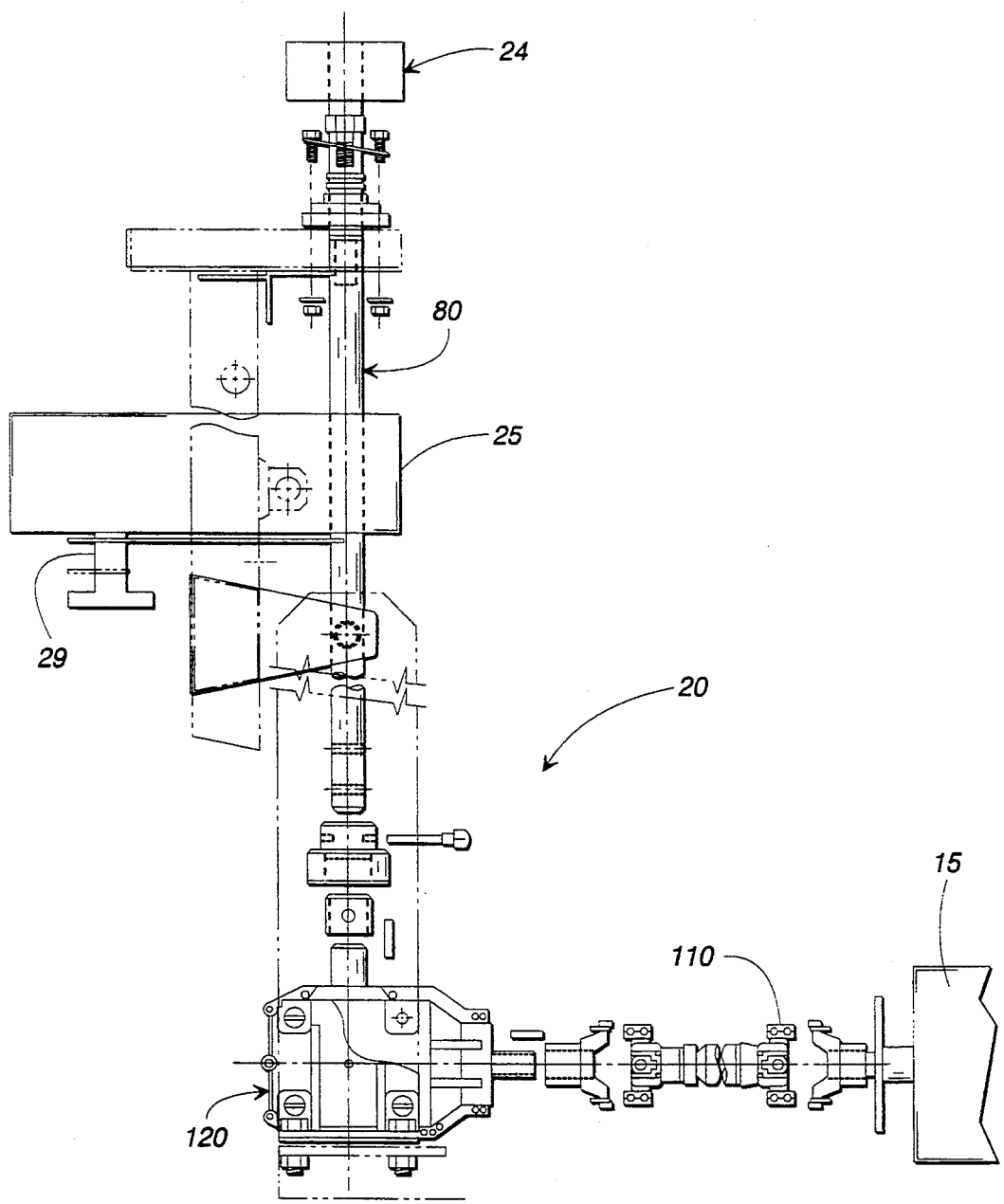
FIG. 5 shows an exploded view of the physical structure of the drive train system of a drill rig with a brake diagramatically shown on the Kelly bar of the drive train system.

Referring now to the drawings, in which like numerals refer to like parts throughout the several views, FIG. 1 shows the relevant portion of a drill rig on which the safety shutdown system of the present invention is installed. With reference to FIG. 1, there is disclosed a drill rig 10 including the shutdown device 30 of the present invention. The drill rig 10, without the safety shutdown system of the present invention, is similar to the drill rig disclosed and shown in the '280 patent, which is incorporated herein by reference. The construction and operation of these drill rigs are known in the art. The drill rig 10 comprises a support frame 11 mounted on a truck 13, a rotary drill tool 14 mounted for rotation on the support frame 11, a drive train 20 (as shown in greater detail in FIGS. 4 and 5), and an internal combustion engine (not shown). The drill tool 14 is an auger in FIGS. 1 and 2 and is suspended downward from a tool adaptor 29 which is connected to the drill spindle 31 extending from a rotary box 25. The rotary box is attached to the drive train 20 as shown in FIGS. 4 and 5. The drill spindle and drill tool are raised and lowered by hydraulic feed cylinders 27 which move the rotary box 25 up and down. There are also other drill rig structures which are known in the art. The apparatus of the present invention is designed to accommodate and can be used in connection with these other drill rigs as well as the one disclosed above.

As shown in FIG. 4, the drive train 20 of the drill rig 10 includes a transmission 15 with a clutch 26, a first drive shaft 110 with a brake 24 mounted thereon, a right angle drive 120, a second drive shaft or Kelly bar 80, and a rotary box 25 connecting the Kelly bar to the drill spindle 31. As shown in FIG. 5, the location of the brake 24 can also be on the Kelly drive bar 80. The clutch 26 comprises a declutch valve when the drill rig uses a power shift transmission and a declutch hydraulic cylinder when the drill rig uses a manual shift transmission.

Figure 3:
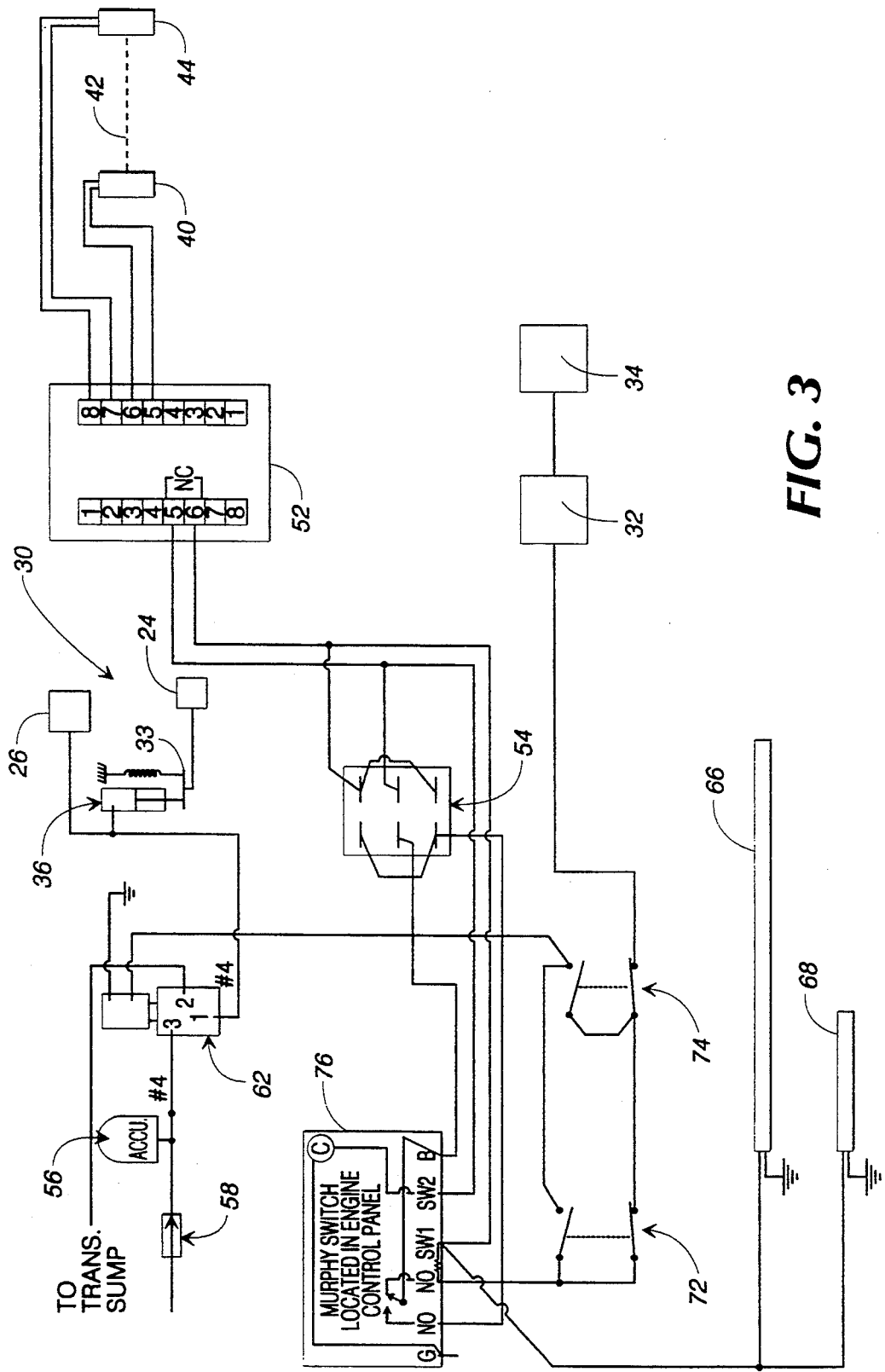
FIG. 3 is a block diagram of the controller of the shutdown device of the present invention.

With reference to FIG. 3, an engine fuel solenoid 32 with a corresponding engine fuel shut-off valve 34 is provided to stop the engine upon activation of a shutdown switch. A brake solenoid valve 62 is provided to operate the brake 24 through a brake cylinder 36. In addition to operating the brake 24, the brake solenoid valve 62 preferably is also used to activate the clutch 26 for the transmission. It should be noted that the shutdown system of the present invention can be used with either shutting off the engine via activation of the fuel shut-off valve or by declutching the transmission. The system can also use both the clutch and engine shut-off device in operation. In operation, when the engine fuel solenoid 32 is de-energized, the corresponding engine shut-off valve is activated and engine operation is stopped. Preferably, the engine is a diesel engine and the engine shut-off valve shuts down the engine by shutting off fuel flow into the engine. The brake 24 on the drive train 20 is equipped with a brake solenoid valve 62 which, when energized, causes the brake 24 to be applied to the drive shaft 110 or the Kelly bar 80. In operation, when the brake solenoid valve 62 is energized, the brake activation cylinder 36 activates the brake 24 by moving a lever 33 on the brake.

With reference to FIG. 1, the safety shutdown apparatus 30 includes an infrared beam transmitter 40 which is positioned adjacent to the drill tool 14 and is aligned to transmit an infrared beam 42 to be received by an infrared beam receiver 44 which is positioned on the opposite side of the drill tool 14 from the transmitter 40. In the preferred embodiment, the transmitter and receiver are positioned below the "operator's step" 46 and the "helper's step" 48, respectively, on the drill rig as shown in FIG. 1. The transmitter 40 and receiver 44 can be placed on either step so long as they are opposite from each other. It is also possible to place the transmitter 40 and receiver 44, or other transmitters and receivers, in other areas surrounding the drill rig in order to establish a zone of exclusion adjacent the rotating drill tool 14. Therefore, the shutdown system of the present invention may be customized for each user of the drill rig 10. A controller 52 (FIG. 3) is connected to the infrared receiver 44 and controls the operation of the engine fuel solenoid 32 and/or the brake/clutch solenoid valve 62.

FIG. 3 shows a block diagram of the shutdown system 30 of the present invention. The system includes an accumulator 56 for storing energy in the form of static hydraulic pressure. The accumulator 56 is charged from the transmission clutch pressure when a power shift transmission is used. If a power shift transmission is not used, the accumulator will have to be charged from some other source, such as the hydraulic system used to raise and lower the rotary box 25. A check valve 58 is provided to prevent the accumulator from discharging backwards when the engine is shut down. An electric brake solenoid valve 62 is provided with ports 1, 2, and 3 as shown in FIG. 3. The electric solenoid valve will control the application of the brake 24 to the drive train 20 by activating the brake activation cylinder 36. The electric brake solenoid valve 62 also controls the clutch 26 which is used with the shutdown system. The accumulator must have enough charge to activate the brake cylinder 64 and the clutch 26, if used. When the shutdown system of the present invention has not been activated, Ports 1 and 2 of the electric solenoid valve serve as a closed circuit which drains hydraulic pressure to prevent pressure from being applied to the brake 24. A brake cylinder 36 is provided which, when activated, operates a manual lever 33 to set the brake 24. The brake is preferably a caliper type brake; however, a drum brake or other brakes known in the art may also be used.

FIG. 3 also shows a basic diagram of the controller 52 which initiates the shutdown system of the present invention when the beam 42 between the transmitter 40 and receiver 44 is interrupted. The controller 52 is connected to a Murphy switch 76, which are known in the art, that controls all shutdown systems of the drill rig 10.

In operation, if the infrared beam 42 is interrupted between the transmitter 40 and the receiver 44, the receiver sends a signal to controller 52. In response to this signal from the receiver 44, the controller 52 is activated. In the preferred embodiment, when the controller 52 is activated by the signal from receiver 44, the controller "opens" a relay which is "normally closed." As shown in FIG. 3, the "normally closed" relay (NC) on the controller opens the connection between SW1 and SW2 on the Murphy switch 76 which opens the main relay on the Murphy switch. This deenergizes the solenoid 32 to shut the drill rig down and energizes brake solenoid valve 62 to set the brake 24 and also causing the clutch 26 to be placed in "neutral."

The present invention may also activate any combination of the solenoids 32 and 62 to shut off the drill rig 10. In addition to the infrared transmitter 40 and receiver 44, several additional shutdown switches may be used to control any combination of the solenoids to shutdown the drill rig 10 or the rotary drill spindle 31 and drill tool 14. These additional shutdown systems operate on the same circuitry as the infrared shutdown system of the present invention. The safety shutdown system 30 of the present invention may also include a rocker-type switch 54 which, when activated by the operator, bypasses the shutdown device 30, as shown in FIG. 3, and energizes brake solenoid valve 62 to set the brake to allow an operator to perform needed work around the drill spindle. Therefore, the engine can continue operating while a drill rig operator performs necessary tasks on the drill tool 14.

FIG. 3 also shows the present invention as used in combination with other drill rig shut-down devices which are known in the art. For instance, there are two separate switch tape shutdown switches 66 and 68 which if contacted by an operator would shutdown the drill rig. There are also two emergency stop buttons 72 and 74 provided, one button for the "operator" side 46 of the drill rig and one button for the "helper" side 48 of the drill rig. The operation of all of these shut down devices is controlled by the Murphy switch device 76 which is located in the engine control panel.

FIGS. 4 and 5 show the preferred drive train 20 for the drill rig of the present invention. The drive train 20 is driven by the transmission of the drill rig device. The preferred drive train 20 includes a right angle drive mechanism 120 and a Kelly drive bar 80, which are known in the art. The brake 24 which is applied to the drive train upon activation of the brake solenoid valve 62 can either be applied on the Kelly bar 80 or on the first shaft 110 of the drive train 20. FIG. 4 shows the first drive shaft 110, with the brake 24 positioned on the drive train 20, and FIG. 5 shows the brake positioned on the Kelly bar 80.

It will thus be seen that a drill rig safety shutdown device which eliminates many problems caused by other types of safety shutdown devices by its use of a proactive system to shutdown the drill rig. While this invention has been described in detail with particular reference to preferred embodiments thereof, it will be understood that variations and modifications can be effected within the spirit and scope of the invention as described hereinbefore and as defined in the appended claims.

We claim:

1. A safety shutdown system for a rotary drill rig having a power supply, a support frame and a rotary drill spindle and drill tool connected to said support frame, said spindle and tool being driven by a drive train, and said drive train being connected by a clutch with a declutch mechanism to an internal combustion engine and an engine solenoid with an engine shut-off switch and a brake on the drive train with a brake solenoid, the improvement comprising:

an infrared beam transmitter positioned adjacent to said drill tool;
   an infrared beam receiver positioned adjacent to said drill tool and on the opposite side of said drill tool from said beam transmitter so that it can receive infrared beams emitted from said transmitter; and
   a controller connected between said clutch solenoid and said engine solenoid and said receiver and activated when said infrared beam between said transmitter and said receiver is interrupted said controller to activate at least one of said clutch engaging solenoid and said engine solenoid to stop said drill spindle and drill tool.

2. The system of claim 1, further comprising:
   said brake solenoid also being connected to said controller and is activated to apply said brake to said drive train when said controller is activated.

3. The system of claim 2, further comprising: said declutch mechanism also being connected to operate off of said brake solenoid so that said drive train is placed in neutral upon activation of said brake solenoid.

* * * * *